W. A. GRUENEWALD & E. G. WRIGHT.
VEHICLE WHEEL.
APPLICATION FILED NOV. 12, 1907.
912,119.
Patented Feb. 9, 1909.
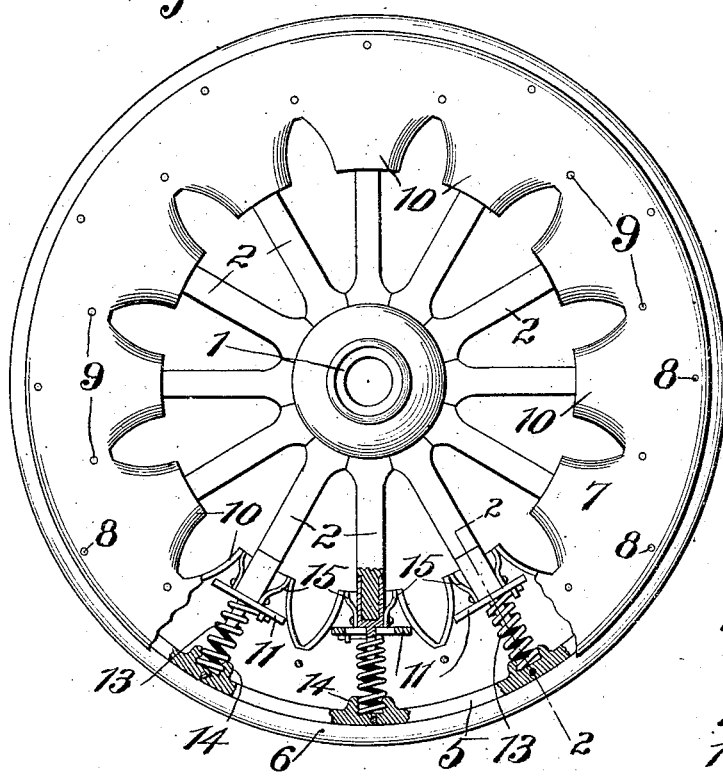
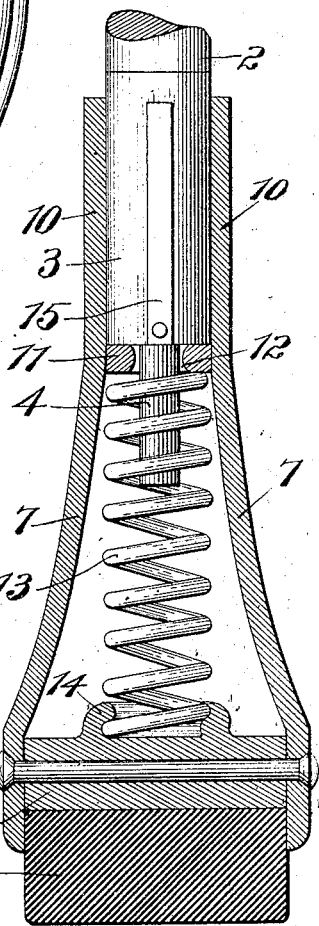
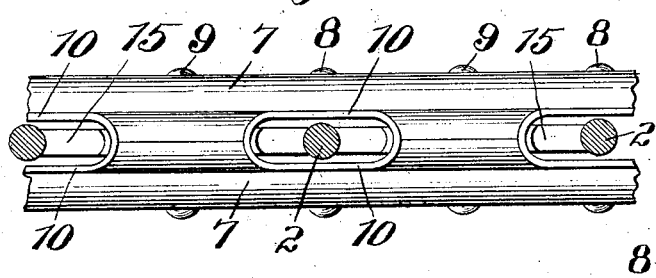
Attest.
Edgar T. Turner
M. P. Smith
Inventors:—
Walter A. Gruenewald and
Emmett G. Wright.
By Higdon Longan. Attys.

UNITED STATES PATENT OFFICE.

WALTER A. GRUENEWALD AND EMMETT G. WRIGHT, OF ST. LOUIS, MISSOURI.

VEHICLE-WHEEL.

No. 912,119.   Specification of Letters Patent.   Patented Feb. 9, 1909.

Application filed November 12, 1907. Serial No. 401,864.

*To all whom it may concern:*

Be it known that we, WALTER A. GRUENEWALD and EMMETT G. WRIGHT, both citizens of the United States, and residents of St. Louis, Missouri, have invented certain new and useful Improvements in Vehicle-Wheels, of which the following is a specification containing a full, clear, and exact description, reference being had to the accompanying drawings, forming a part hereof.

Our invention relates to a vehicle wheel, and our object being to construct a wheel wherein springs are arranged between the spokes and the rim and tire in order to obtain a yielding or cushioning effect while the wheel is in operation without the use of the usual pneumatic tires.

To the above purposes, our invention consists of certain novel features of construction and arrangement of parts, which will be hereinafter more fully set forth, pointed out in the claims, and illustrated in the accompanying drawings, in which:—

Figure 1 is an elevation of a wheel of our improved construction with part of the rim in section; Fig. 2 is an enlarged vertical section taken approximately on the line 2—2 of Fig. 1; Fig. 3 is a view looking at the inner edge of the rim, and showing a number of the spokes in section.

Referring by numerals to the accompanying drawings:—1 designates the hub of the wheel in which is seated the spokes 2, and rigidly fixed on the ends of said spokes are sockets 3, with which are formed integral the pins or stems 4.

5 designates a solid rim, preferably formed of metal, and arranged on said rim is a solid rubber tire 6.

7 designates rings or plates which are secured by means of bolts or rivets 8 to the rim 5, and the outer edges of the plates extend beyond said rim and engage the side faces of the tire 6. The plates 7 are held together by bolts or rivets 9, and formed integral with the inner edges of said plates are the extensions 10, which serve as housings for the outer ends of the spokes 2. Located within the housings formed by these extensions 10 are the plates 11, which are slotted, as designated by 12, said plates bearing against the outer ends of the sockets 3, with the pins or stems 4 passing through said slots 12. The inner ends of coil springs 13 are fixed in any suitable manner to the outer faces of the plates 11, and the outer ends of said springs being arranged in sockets 14 formed on the inner face of the rim 5.

Fixed in any suitable manner to the outer end of each socket 3 and on opposite sides thereof are flat springs 15, the free ends of which bear against the inner ends of the extensions 10, thus providing means for yieldingly resisting the vertical movement of the outer ends of the spokes when the same occupy a horizontal plane.

When a wheel of our improved construction is in use, the weight of the load upon the axle is transmitted by means of the hub and spokes to the lower spring or series of springs 13, and said spokes will be compressed corresponding to the weight of the load, and the hub and all of the spokes will shift or move downward to a slight degree relative the rim 5, tire 6, and plate 7, which movement is possible owing to the arrangement of the springs 13 between the ends of the spokes and the rim 5, and the arrangement of the pin and slot connection between the ends of the spokes and the plates 11. The openings between the ends of the extensions 10 permit the spokes to move vertically when in horizontal positions, and which movement is opposed by the flat springs 15.

By utilizing coil springs of proper tension, the rim of the wheel will yield readily relative the hub and spokes while in use, and practically the same resiliency is obtained as where an ordinary pneumatic tire is used.

We claim:—

1. In a vertical wheel, the combination with the usual hub and spokes, of a rim, plates secured to the sides of said rim and inclosing the outer ends of the spokes, springs interposed between the rim and the ends of the spokes, and springs fixed to the spokes and bearing against adjacent portions of the plates.

2. A vehicle wheel, comprising a hub and spokes, a solid rim, a tire arranged on the rim, plates secured to the rim and inclosing the outer ends of the spokes, springs interposed between the rim and the inner ends of the spokes, and springs fixed to the spokes and bearing against adjacent portions of the plates.

3. A vehicle wheel, comprising a hub and spokes, stems projecting from the outer ends of the spokes, a solid rim, a flexible tire arranged on the rim, plates secured to the rim and inclosing the outer ends of the spokes, slotted plates arranged at the outer ends of the spokes and the stems on the ends of the spokes passing through the ends of the slots in said last mentioned plates, springs interposed between the rim and the slotted plates, and flat springs fixed to the outer ends of the spokes and bearing against adjacent portions of the plates carried by the rim.

In testimony whereof, we have signed our names to this specification, in presence of two subscribing witnesses.

WALTER A. GRUENEWALD.
EMMETT G. WRIGHT.

Witnesses:
M. P. SMITH,
E. L. WALLACE.